United States Patent [19]

Gillespie

[11] Patent Number: 5,470,486

[45] Date of Patent: Nov. 28, 1995

[54] CONVERSION OF WATER-SOLUBLE INORGANIC SULFIDE COMPOUNDS IN AN AQUEOUS STREAM

[75] Inventor: Ralph D. Gillespie, Elgin, Ill.

[73] Assignee: UOP, Des Plaines, Ill.

[21] Appl. No.: 262,708

[22] Filed: Jun. 20, 1994

[51] Int. Cl.[6] ......................................................... C02F 1/76
[52] U.S. Cl. ............................ 210/758; 210/762; 210/763
[58] Field of Search ..................................... 210/758, 761, 210/762, 763

[56] References Cited

U.S. PATENT DOCUMENTS

| | | | |
|---|---|---|---|
| 3,209,202 | 4/1962 | Brown | 210/63 |
| 3,672,836 | 6/1972 | Brown | 23/224 |
| 4,699,720 | 10/1987 | Harada et al. | 210/763 |
| 4,784,775 | 11/1988 | Hardison | 210/763 |
| 4,855,123 | 8/1989 | Suzuki et al. | 210/763 |
| 4,925,569 | 5/1990 | Chou et al. | 210/763 |
| 5,120,453 | 6/1992 | Frame et al. | 210/763 |
| 5,207,927 | 5/1993 | Marinangeli et al. | 210/763 |
| 5,292,440 | 3/1994 | Hardison | 210/763 |
| 5,338,463 | 8/1994 | Yan | 210/763 |

*Primary Examiner*—Neil McCarthy
*Attorney, Agent, or Firm*—Thomas K. McBride; John G. Tolomei; John G. Cutts, Jr.

[57] ABSTRACT

A method for treating an aqueous stream containing a water-soluble, inorganic sulfide compound wherein the stream is contacted with oxygen in a thermal, non-catalytic conversion zone to convert the inorganic sulfide compound to sulfate and thiosulfate. The aqueous effluent from the thermal, non-catalytic conversion zone is then contacted with oxygen and an oxidizing catalyst on a carbon support at catalytic oxidation conditions selected to provide a high conversion of the thiosulfate to sulfate which produces a substantially sulfide-free aqueous stream.

7 Claims, No Drawings

CONVERSION OF WATER-SOLUBLE INORGANIC SULFIDE COMPOUNDS IN AN AQUEOUS STREAM

BACKGROUND OF THE INVENTION

The field of art to which this invention pertains is the treatment of aqueous streams containing water-soluble inorganic sulfide compounds. More specifically, the invention is directed toward a method for treating an aqueous stream containing a water-soluble, inorganic sulfide compound.

INFORMATION DISCLOSURE

U.S. Pat. No. 3,672,836 (Brown) discloses a process wherein an aqueous stream containing a water-soluble, inorganic sulfide compound is treated by contacting the aqueous stream and oxygen, in an amount selected to react less than 0.5 mol of oxygen per mol of sulfide compound with a first oxidizing catalyst at oxidizing conditions, including a relatively low pressure and temperature, selected to form an effluent stream containing a water-soluble polysulfide; and thereafter by contacting the polysulfide-containing effluent stream and oxygen in an amount less than the amount utilized in the first step, with a second oxidizing catalyst at oxidizing conditions, including a temperature greater than, or equal to, the melting point of sulfur and a pressure sufficient to maintain at least a portion of the effluent stream in the liquid phase, selected to produce liquid sulfur and a substantially sulfide-free treated water stream.

Key features of the '836 patent involve the use of a first catalytic oxidation step which is run at relatively low temperatures and pressures to produce polysulfide, coupled with a second catalytic oxidation step which is run at relatively high temperatures and pressures to selectively oxidize the polysulfide to elemental sulfur, thereby preventing the deposition of elemental sulfur on the catalyst used during these oxidation steps while simultaneously minimizing the amount of oxygen which must be supplied at the relatively high pressures.

U.S. Pat. No. 3,029,202 (Brown) discloses a method of treating waste water containing a sulfur impurity which comprises reacting the sulfur impurity with ascending air in contact with a phthalocyanine catalyst during descent of the water in a cooling tower. Although a portion of the sulfur impurities are converted to sulfates, the sulfur impurities are primarily converted to the corresponding thiosulfates.

U.S. Pat. No. 5,207,927 (Marinangeli et al) discloses a method for treating an aqueous stream containing a water-soluble, inorganic sulfide compound which comprises (a) contacting the aqueous stream and oxygen at a pH in the range less than about 12 and an oxygen to sulfur molar ratio greater than about 5 with a metallic phthalocyanine oxidizing catalyst at oxidation conditions selected to provide a high conversion of said inorganic sulfide compounds in an amount greater than about 95 weight percent to sulfate and (b) recovering a substantially sulfur-free treated aqueous stream.

In various industrial applications, water containing sulfur impurities is collected prior to disposal. For example, in a petroleum refinery, large quantities of water are used in refining operations such as purifying hydrocarbon fractions, steam distillation, heat transfer, and dilution of corrosive materials. The more abundant impurities are hydrogen sulfide, mercaptans and thiophenols. With the increase in the size of petroleum refineries and in the number of processing steps in refinery operations, the amount of impurities in the water is increased to an extent that may be harmful to marine life when the waste water is disposed of in the neighboring streams.

The impurities in waste water from the petroleum refineries include ammonium sulfide, sodium sulfide, potassium sulfide, mercaptans and hydrogen sulfide. Although these impurities comprise a minute portion of a large volume of water, the sulfides consume oxygen when disposed in streams and rob aquatic life of necessary oxygen. Therefore, those skilled in the art constantly seek to find techniques which eliminate water-soluble inorganic sulfide compounds from aqueous waste streams.

At least one prior art process uses a single-stage approach for the conversion of water-soluble, inorganic sulfide compounds in an aqueous solution by contacting the solution with oxygen and a metallic phthalocyanine oxidizing catalyst at a pH less than about 12. Frequently, the most common aqueous solutions containing water-soluble, inorganic sulfide compounds are spent caustic solutions and other aqueous streams having a pH greater than 12. It has been discovered that when a high pH aqueous solution, greater than about 12, is processed over an oxidizing catalyst which is associated with an activated carbon support, the carbon support tends to disintegrate with time and the continuous treatment of aqueous solutions then becomes impossible. Therefore, in order to use the prior art process, the pH must be chemically lowered which results in additional cost.

In accordance with the present invention, a thermal non-catalytic conversion of an aqueous sulfide solution is capable of converting the sulfide to sulfate and thiosulfate which have been discovered not to attack and destroy carbon catalyst support. The resulting effluent from the thermal non-catalytic conversion may then be completely converted to sulfate by using an oxidizing catalyst which is supported on carbon or activated carbon. A novel method has been discovered to convert sulfide impurities in waste water by converting the water-soluble inorganic sulfide compounds to sulfate which has no oxygen demand.

BRIEF SUMMARY OF THE INVENTION

The invention provides a process for treating an aqueous stream containing a water-soluble, inorganic sulfide compound by contacting the aqueous stream with oxygen in a thermal non-catalytic conversion zone to convert the inorganic sulfide to sulfate and thiosulfate and then contacting the aqueous effluent from the thermal, non-catalytic conversion zone with oxygen and an oxidizing catalyst on a carbon support at catalytic oxidation conditions selected to provide a high conversion, if not complete, of the thiosulfate to sulfate which produces a substantially sulfide-free aqueous stream.

One embodiment of the present invention is a method for treating an aqueous stream comprising a water-soluble, inorganic sulfide compound which method comprises the steps of: (a) contacting the aqueous stream and oxygen in a thermal, non-catalytic conversion zone to convert the inorganic sulfide compound to sulfate and thiosulfate; (b) contacting the aqueous effluent from the thermal conversion zone and oxygen with an oxidizing catalyst on a carbon support at catalytic oxidation conditions selected to provide a high conversion of the thiosulfate in an amount greater than about 90 weight percent to sulfate; and (c) recovering a substantially sulfide-free treated aqueous stream.

Another embodiment of the present invention is a method for treating an aqueous stream having a pH greater than about 12 and comprising a water-soluble, inorganic sulfide compound which method comprises the steps of: (a) contacting the aqueous stream and oxygen in a thermal, non-catalytic conversion zone to convert the inorganic sulfide compound to sulfate and thiosulfate; (b) contacting the aqueous effluent from the thermal conversion zone and oxygen at a pH greater than about 12 and an oxygen to sulfur molar ratio greater than about 4 with a metallic phthalocyanine oxidizing catalyst supported on activated carbon to provide a high conversion of the thiosulfate in an amount greater than about 90 weight percent to sulfate; and (c) recovering a substantially sulfide-free aqueous stream.

DETAILED DESCRIPTION OF THE INVENTION

Large quantities of aqueous solutions of inorganic sulfide compounds are currently being produced by industry. In particular, aqueous solutions containing sulfide salts are by-products of many economically significant industrial processes in the chemical, petroleum, steel, manufactured gas, natural gas, paper pulp and the like industries. These aqueous solutions containing sulfide salts have, in the past, generally been regarded as waste water streams which are to be disposed of at the lowest possible cost. In many cases, this last requirement has dictated the discharge of these waste streams into sewer systems or surrounding streams, lakes and bays. With the advent of the growing public concern over the substantial water pollution problems thereby produced, this direct discharge of these streams is becoming less and less an acceptable alternative. In fact, because these streams contain sulfide salts which have a substantial chemical oxygen demand and cause substantial water pollution problems, a growing number of states and the federal government are imposing stringent requirements on the discharge of this type of waste stream. In many situations where these waste streams are produced, it is, moreover, desired to recover a treated water stream which can be recycled to the industrial process from which the sulfide-containing water stream originally came in order to minimize the requirements for make-up water. For example, in the petroleum industry, a water stream is typically utilized to remove ammonia hydrosulfide salts from the effluent equipment associated with such hydrocarbon conversion processes as hydrorefining, hydrocracking, catalytic cracking and reforming, wherein ammonia and hydrogen sulfide by-products are produced. The original purpose for injecting the water stream into these processes was to remove these detrimental ammonium hydrosulfide salts which can form in the heat transfer equipment that is utilized in these processes to cool the effluent stream from the hydrocarbon conversion step. These salts, if not removed from this equipment, accumulate therein and eventually restrict the passage of the effluent stream therethrough. The waste stream so formed presented a substantial pollution hazard insofar as it contains sulfide salts, which are considered hazardous due to reactivity. In addition, sulfides are toxic to oxidation-promoting bacteria and have a substantial biochemical oxygen demand, and ammonia is a nutrient that leads to excessive growth of marine organisms. Another example is encountered in many industrial processes where it is desired to remove hydrogen sulfide from a mixture of gases containing the same with a suitable scrubbing solution which generally is an aqueous alkaline solution or an aqueous ammoniacal solution. The scrubbing solution reacts with the hydrogen sulfide to produce sulfide salts, and the resulting solution must be either regenerated or disposed. These last sulfide solutions are typical of those that can be treated by the method of the present invention in order to convert the sulfide contained therein into aqueous solutions containing sulfate, to minimize the biochemical oxygen demand of the resulting treated solution, and to prepare an essentially sulfide-free treated water stream which is suitable for reuse or recovery of the salts which are produced. In accordance with the present invention, a substantially sulfide-free aqueous stream contains less than about 1 weight percent sulfide.

The water-soluble inorganic sulfide compounds present in these aqueous streams is generally present as a salt of a common base such as ammonium sulfide or hydrosulfide; an alkali metal sulfide such as sodium sulfide or hydrosulfide, potassium sulfide or hydrosulfide; an alkaline earth metal sulfide such as calcium sulfide or hydrosulfide; and the like compounds. In this respect, it should be noted that hydrogen sulfide, because of its polar nature, is soluble in aqueous solutions to some degree, even in the absence of an appropriate solubility increasing agent; for example, at 20° C. and 1 atmosphere pressure, 2.5 ml of hydrogen sulfide will dissolve in 1 ml of water. Thus, hydrogen sulfide is a water-soluble inorganic sulfide compound.

In accordance with the process of the present invention, a method has been found for treating these aqueous streams containing water-soluble sulfide compounds in order to selectively convert essentially all of the sulfur values to sulfate. At this point, it is to be recognized that an essential feature of the present invention is the utilization of a combination of a thermal reaction zone and a catalytic reaction zone to selectively produce sulfate while avoiding the production of polysulfides, elemental sulfur or any other sulfur compounds.

The aqueous stream containing a water-soluble sulfide compound, that is the principal input stream to the present process, may be produced in one or more of the number of industrial processes that are faced with a water disposal problem of this kind. Typically, the water-soluble inorganic sulfide compound present in this stream will be selected from one or more of the following classes: (1) hydrogen sulfide; (2) ammonium sulfide or hydrosulfide; (3) alkali metal sulfides or hydrosulfides such as sodium sulfide or hydrosulfide, potassium sulfide or hydrosulfide; (4) alkaline earth metal sulfides or hydrosulfides such as the sulfides or hydrosulfides of calcium, strontium, or barium and the like compounds. Similarly, the amount of the sulfide compound present in these aqueous streams may vary over a wide range up to the solubility limit of the particular salt in water. Typically, the amount of the water-soluble sulfide compound contained in the waste stream charged to the thermal non-catalytic conversion zone is about 0.01 to about 20 wt. % calculated as equivalent sulfur of this stream. For example, a typical water stream from a hydrocracking plant contains about 6 wt. % sulfur as ammonium hydrosulfide. In general, the method of the present invention gives excellent results when the aqueous stream charged thereto contains ammonium hydrosulfide. In accordance with the present invention, it is essential that the first contacting step of the aqueous stream and oxygen is conducted in a thermal non-catalytic conversion zone preferably operated at conditions including a temperature from about 212° F. (100° C.) to about 392° F. (200° C.), a pressure from about 1 psig (6.9 kPa gauge) to about 1000 psig (6895 kPa gauge) and a liquid hourly space velocity from about 0.05 $hr^{-1}$ to about 20 $hr^{-1}$.

An essential reactant for the method of the present invention is oxygen. This may be utilized in any suitable form either by itself or mixed with other relatively inert gases. In general, because of economic factors, it is preferred to utilize air streams as the source for the necessary oxygen in the oxidation steps of the present invention. The amount of oxygen utilized in the thermal non-catalytic oxidation step is preferably present to provide an oxygen to sulfur molar ratio greater than about 4.

The effluent from the thermal non-catalytic oxidation zone is subsequently introduced in to a catalytic oxidation zone preferably operated at conditions including a temperature from about 212° F. (100° C.) to about 320° F. (160° C.), a pressure from about 1 psig (6.9 kPa gauge) to about 1000 psig (6895 kPa gauge) and a liquid hourly space velocity from about 0.05 $hr^{-1}$ to about 20 $hr^{-1}$. The oxygen used in the catalytic oxidation zone is preferably present to provide an oxygen to sulfur molar ratio greater than about 4.

The catalyst utilized in the catalytic oxidation zone of the present invention can generally be suitable oxidizing catalyst that is capable of effecting substantially complete conversion of the water-soluble sulfide compound contained in the aqueous stream. A particularly preferred class of catalysts for the catalytic oxidation step are metal phthalocyanines. Examples of suitable carbon support materials for oxidizing catalysts are charcoal, such as wood charcoal or bone charcoal, which may or may not be activated prior to use, and activated carbons and other similar activated carbon support materials familiar to those skilled in the art. The preferred carbon support is activated carbon.

The preferred oxidizing catalysts for use in the catalytic oxidation step comprise a metallic phthalocyanine compound combined with a suitable carbon support such as activated carbon, for example. Particularly preferred metal phthalocyanine compounds include those of the iron group metals and vanadium. Other metal phthalocyanine compounds that may be utilized include those of copper, molybdenum, manganese, or tungsten. Best results are ordinarily obtained when the metal phthalocyanine is a cobalt phthalocyanine compound. Moreover, any suitable derivative of the metal phthalocyanine may be employed including the sulfonated derivatives and carboxylated derivatives, with the monosulfonated and polysulfonated derivative being particularly preferred. The oxidizing catalyst such as a phthalocyanine compound, for example, is utilized as a composite with a carbon support such as the ones enumerated above, and the preferred carbon support is activated carbon. The amount of the oxidizing catalyst such as a phthalocyanine compound, for example, combined with the carbon support may be any amount which is catalytically effective. However, because of the high activity of the metal phthalocyanine catalyst, good results are ordinarily obtained when it comprises about 0.001 to about 5 wt. % of the composite with best results obtained when it comprises about 0.01 to about 2 wt. % of the composite.

Although the catalytic oxygenation step can be performed according to any of the methods taught in the art for contacting a liquid stream and a gas stream with a solid catalyst, the preferred system involves a fixed bed of the solid oxidizing catalyst disposed in a treatment zone. The aqueous input stream is then passed therethrough in either upward, radial or downward flow and the oxygen or air stream is passed thereto in either cocurrent or countercurrent flow relative to the aqueous waste stream. The preferred mode is downflow and cocurrent flow for the oxidizing step.

In addition to the conversion of water-soluble, inorganic sulfide compounds to sulfate in the catalytic oxidation zone, an additional advantage is achieved because the preferred catalyst support is activated carbon which serves as an adsorbent to remove trace quantities of hydrocarbon compounds and/or other organic compounds which may be present in the aqueous feed streams. Since an important feature of water clean-up or remediation is the removal of organic compounds, the method of the present invention achieves a multi-faceted and desirable result.

Following the catalytic oxidation step, an effluent stream withdrawn therefrom which typically comprises a treated aqueous stream which is substantially free of the water-soluble sulfide compound originally present in the feed stream. In addition, the aqueous stream will contain sulfate salts. In the case where the oxygen is supplied to the catalytic oxidation zone via an air stream, the effluent stream which is withdrawn from the catalytic oxidation zone will contain inert nitrogen which may easily be separated in a suitable vapor-liquid separating means.

In some cases, it may be desirable or economically expedient to recover the resulting sulfate as a product for use elsewhere. The recovery of sulfate from an aqueous solution is known in the art and any suitable technique may be utilized for this recovery. With the removal of sulfate from water, even greater remediation is achieved by the removal of dissolved solids.

EXAMPLE 1

An aqueous feedstock was prepared and which contained 2 weight percent sulfide in a 7 weight percent sodium hydroxide solution and had a pH of about 13.5. This aqueous feedstock was charged to a reactor loaded with inert spherical beads having a ¼" diameter at operating conditions which included a pressure of 400 psig (2758 kPa gauge), a temperature of 302° F. (150° C.), an oxygen to sulfur molar ratio of 5 (oxygen fed as air) and a liquid hourly space velocity of 1. The resulting liquid effluent was analyzed and there was complete conversion of the sulfide to sulfate and thiosulfate with a sulfate/thiosulfate milo of 1.5. This example demonstrates that an aqueous sulfide solution can be converted to a mixture of sulfate and thiosulfate in a thermal, non-catalytic conversion zone.

EXAMPLE 2

A batch of granulated activated carbon having a particle size distribution presented in Table 1 was selected.

TABLE I

| ACTIVATED CARBON SIZE DISTRIBUTION | |
|---|---|
| Mesh Particle Size | Weight Percent |
| 10–20 | 90 |
| 20–40 | 9 |
| >40 | 1 |

In each of the following experiments, activated carbon in an mount of 1.7 grams was loaded into a metal test tube. In Experiment 1, an aqueous solution of sodium hydroxide having a pH of 13.5 was used to fill a metal test robe containing 1.7 grams of activated carbon. The tube was loaded into a rotating autoclave, pressured to 400 psig and heated to 160° C. The sample was rotated for 80 hours. Afterwards, the autoclave was cooled and the sample was removed and dried. The resulting dried activated carbon was sieved with 10, 20 and 40 mesh sieves, and the amount of material in each size range was measured. The results are presented in Table 2. Experiment 1 demonstrates that an aqueous alkaline solution has only a small effect on the attrition of the activated carbon in the test.

In Experiment 2, an aqueous solution of sodium sulfide and sodium hydroxide having a pH of 13.5 was used to fill a metal test tube containing 1.7 grams of activated carbon. The total sulfur concentration was 2 weight percent of the solution. The above-described rotating autoclave procedure was followed and the results are summarized and presented in Table 2. Experiment 2 demonstrates that an aqueous alkaline solution containing sulfide causes significant activated carbon decomposition to fines.

In Experiment 3, an aqueous solution of sodium sulfate and sodium hydroxide having a pH of 13.5 was used to fill a metal test tube containing 1.7 grams of activated carbon. The total sulfur concentration was 2 weight percent of the solution. The same autoclave procedure was followed and the results are presented in Table 2. Experiment 3 demonstrates that an aqueous alkaline solution containing sodium sulfate has only a small effect on the attrition of the activated carbon in the test.

In Experiment 4, an aqueous solution of sodium thiosulfate and sodium hydroxide having a pH of 13.5 was used to conduct the same procedure as described hereinabove and the results are presented in Table 2. The total sulfur concentration was 2 weight percent of the solution. Experiment 4 demonstrates that an aqueous alkaline solution containing sodium thiosulfate has only a small effect on the attrition of the activated carbon in the test.

In Experiment 5, an aqueous solution of sodium sulfide and sodium hydroxide having a pH of 10 (note: lower than the previous experiments) was used to conduct the same procedure as described hereinabove and the results are presented in Table 2. The total sulfur concentration was 2 weight percent of the solution. Experiment 5 demonstrates that an aqueous alkaline solution containing sodium sulfide and having a pH of 10 has only a small effect on the attrition of the activated carbon in the test.

In Experiment 6, distilled water having a pH of 7 was used to conduct the same procedure as described hereinabove and the results are also presented in Table 2. Experiment 6 demonstrates that water having a neutral pH has only a small effect on the attrition of the activated carbon in the test.

TABLE 2

| Experiment No. | pH | Sulfur Species | 10–20 Mesh, wt. % | 20–40 Mesh, wt. % | >40 Mesh, wt. % |
|---|---|---|---|---|---|
| 1 | 13.5 | None | 87.1 | 5.8 | 7.1 |
| 2 | 13.5 | $Na_2S$ | 54.8 | 25.3 | 19.9 |
| 3 | 13.5 | $Na_2SO_4$ | 98.8 | 0.6 | 0.58 |
| 4 | 13.5 | $Na_2S_2O_3$ | 88.1 | 10.6 | 1.25 |
| 5 | 10 | $Na_2S$ | 95.1 | 3 | 1.9 |
| 6 | 7 | None | 95.9 | 3.6 | 0.52 |

The foregoing description and examples clearly illustrate the advantages encompassed by the process of the present invention and the benefits to be afforded with the use thereof.

What is claimed:

1. A method for treating an aqueous stream having a pH greater than about 12 and comprising a water-soluble, inorganic sulfide compound which method comprises the steps of:

(a) contacting said aqueous stream and oxygen in a thermal, non-catalytic conversion zone to convert said inorganic sulfide compound to sulfate and thiosulfate;

(b) contacting the aqueous effluent from said thermal conversion zone and oxygen at a pH greater than about 12 and an oxygen to sulfur molar ratio greater than about 4 with a metallic phthalocyanine oxidizing catalyst supported on activated carbon to provide a high conversion of said thiosulfate in an amount greater than about 90 weight percent to sulfate; and (c) recovering a substantially sulfide-free aqueous stream.

2. The method of claim 1 wherein said sulfide compound is selected from the group consisting of ammonium sulfide, ammonium hydrosulfide, an alkali metal sulfide, an alkali metal hydrosulfide, an alkaline earth metal sulfide, hydrogen sulfide and an alkaline earth hydrosulfide.

3. The method of claim 1 wherein said metallic phthalocyanine oxidizing agent is an iron group metal phthalocyanine.

4. The method of claim 3 wherein said iron group metal phthalocyanine is cobalt phthalocyanine monosulfonate.

5. The method of claim 1 wherein said thermal, non-catalytic conversion zone is operated at conditions including a temperature of 212° F. (100° C.) to about 392° F. (200° C.), a pressure from about 1 psig (6.9 kPa gauge) to about 1000 psig (6895 kPa gauge) and a liquid hourly space velocity from about 0.05 $hr^{-1}$ to about 20 $hr^{-1}$.

6. The method of claim 1 wherein said catalytic oxidation conditions include a temperature from about 212° F. (100° C.) to about 320° F. (160° C.), a pressure from about 1 psig (6.9 kPa gauge) to about 1000 psig (6895 kPa gauge) and a liquid hourly space velocity from about 0.05 $hr^{-1}$ to about 20 $hr^{-1}$.

7. The method of claim 1 wherein said substantially sulfide-free aqueous stream is processed to recover said sulfate.

* * * * *